United States Patent
Hu et al.

(10) Patent No.: US 7,564,530 B2
(45) Date of Patent: *Jul. 21, 2009

(54) SUB-PIXEL STRUCTURE IN TRANSFLECTIVE COLOR LIQUID CRYSTAL DISPLAY

(75) Inventors: Chih-Jen Hu, Jhongli (TW);
Chih-Ming Chang, Jhongli (TW);
Chih-Chun Pei, Hsinchu (TW);
Kuo-Yung Hung, Hsinchu (TW)

(73) Assignee: Au Optronics Corporation (TW)

( * ) Notice: Subject to any disclaimer, the term of this patent is extended or adjusted under 35 U.S.C. 154(b) by 152 days.

This patent is subject to a terminal disclaimer.

(21) Appl. No.: 11/321,011

(22) Filed: Dec. 29, 2005

(65) Prior Publication Data
US 2007/0153165 A1   Jul. 5, 2007

(51) Int. Cl.
*G02F 1/1343* (2006.01)
*G02F 1/1335* (2006.01)

(52) U.S. Cl. .................. 349/143; 349/109; 349/139; 349/114; 349/48

(58) Field of Classification Search ........... 349/143
See application file for complete search history.

(56) References Cited

U.S. PATENT DOCUMENTS

| | | | |
|---|---|---|---|
| 4,294,524 A | 10/1981 | Stolov | 353/84 |
| 4,600,274 A | 7/1986 | Morozumi | 350/339 |
| 4,946,259 A | 8/1990 | Matino et al. | 350/339 |
| 5,233,385 A | 8/1993 | Sampsell | 355/35 |
| 5,642,176 A | 6/1997 | Abukawa et al. | 349/106 |
| 5,790,213 A * | 8/1998 | Sasaki et al. | 349/48 |
| 5,929,843 A | 7/1999 | Tanioka | 345/150 |
| 7,280,174 B2 | 10/2007 | Park et al. | |
| 7,365,722 B2 * | 4/2008 | Lee | 345/88 |
| 7,388,630 B2 * | 6/2008 | Shin et al. | 349/109 |
| 2001/0019382 A1 | 9/2001 | Song et al. | 349/106 |
| 2002/0099559 A1 * | 7/2002 | Liu et al. | 705/1 |
| 2002/0122160 A1 | 9/2002 | Kunzman | 353/31 |
| 2003/0043336 A1 * | 3/2003 | Sasaki et al. | 349/187 |
| 2004/0141118 A1 * | 7/2004 | Chang et al. | 349/114 |
| 2004/0169807 A1 | 9/2004 | Rho et al. | 349/139 |

(Continued)

FOREIGN PATENT DOCUMENTS

JP        2003-24817        9/2003

(Continued)

*Primary Examiner*—Frank G Font
*Assistant Examiner*—Mary A El Shammaa
(74) *Attorney, Agent, or Firm*—Ware, Fressola, Van Der Sluys & Adolphson, LLP (57) ABSTRACT

The pixel in a transflective color LCD panel of the present invention has an additional sub-pixel area. According to the present invention, a pixel is selectively divided into at least three color sub-pixels in R, G, B and a fourth sub-pixel M. Each of the color sub-pixels R, G and B is selectively divided into a transmission area and a reflection area. The fourth sub-pixel M can be entirely reflective or partially reflective. The color filter for use in the pixel comprises R, G, B color filter segments corresponding to the R, G, B color sub-pixels and a filter segment for the fourth sub-pixel. The filter segment for the fourth sub-pixel can be entirely colorless or partially colorless. Furthermore, one or more of the R, G, B color filer segments associated with the reflection area may have a colorless sub-segment.

21 Claims, 11 Drawing Sheets

U.S. PATENT DOCUMENTS

| | | | |
|---|---|---|---|
| 2004/0179160 A1 | 9/2004 | Rhee et al. | 349/139 |
| 2005/0030450 A1* | 2/2005 | Okamoto et al. | 349/113 |
| 2005/0099559 A1* | 5/2005 | Lee et al. | 349/113 |
| 2005/0134788 A1* | 6/2005 | Park | 349/158 |
| 2007/0063945 A1* | 3/2007 | Hung et al. | 345/88 |
| 2008/0088754 A1* | 4/2008 | Hu et al. | 349/33 |
| 2008/0186422 A1* | 8/2008 | Ishii | 349/44 |

FOREIGN PATENT DOCUMENTS

| | | |
|---|---|---|
| JP | 2005-141196 | 6/2005 |
| TW | 228622 B | 3/2005 |

* cited by examiner

| R | G | B | W | R | G | B | W | R | G | B | W | R | G | B | W | R | G | B | W | R | G | B | W |
|---|---|---|---|---|---|---|---|---|---|---|---|---|---|---|---|---|---|---|---|---|---|---|---|
| R | G | B | W | R | G | B | W | R | G | B | W | R | G | B | W | R | G | B | W | R | G | B | W |
| B | W | R | G | B | W | R | G | B | W | R | G | B | W | R | G | B | W | R | G | B | W | R | G |
| B | W | R | G | B | W | R | G | B | W | R | G | B | W | R | G | B | W | R | G | B | W | R | G |

FIG. 7C

| R | G | B | W | R | G | B | W | R | G | B | W | R | G | B | W | R | G | B | W | R | G | B | W |
|---|---|---|---|---|---|---|---|---|---|---|---|---|---|---|---|---|---|---|---|---|---|---|---|
| R | G | B | W | R | G | B | W | R | G | B | W | R | G | B | W | R | G | B | W | R | G | B | W |
| G | B | W | R | G | B | W | R | G | B | W | R | G | B | W | R | G | B | W | R | G | B | W | R |
| G | B | W | R | G | B | W | R | G | B | W | R | G | B | W | R | G | B | W | R | G | B | W | R |

SUB-PIXEL STRUCTURE IN TRANSFLECTIVE COLOR LIQUID CRYSTAL DISPLAY

CROSS REFERENCE TO RELATED APPLICATIONS

The present invention is related to patent application Ser. No. 11/233,850, filed Sep. 22, 2005, assigned to the assignee of the present invention.

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

Figure 1:
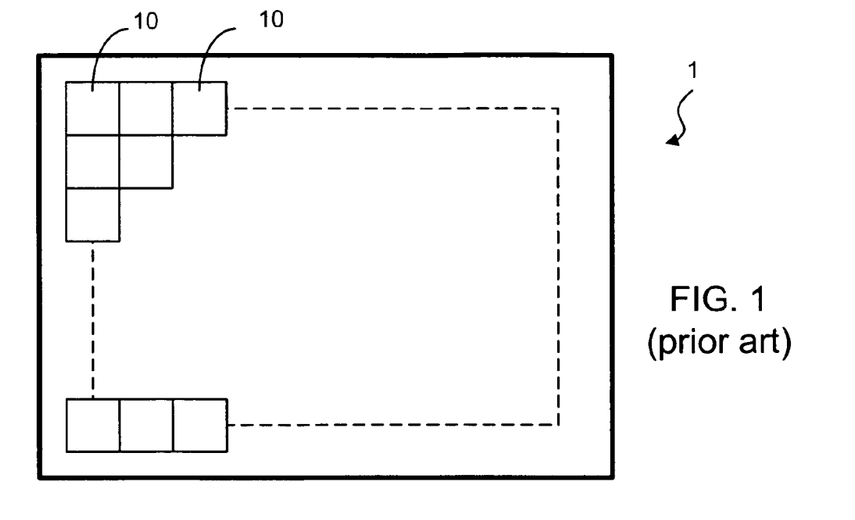
FIG. 1 is a schematic representation of a typical LCD panel.
Figure 2A:
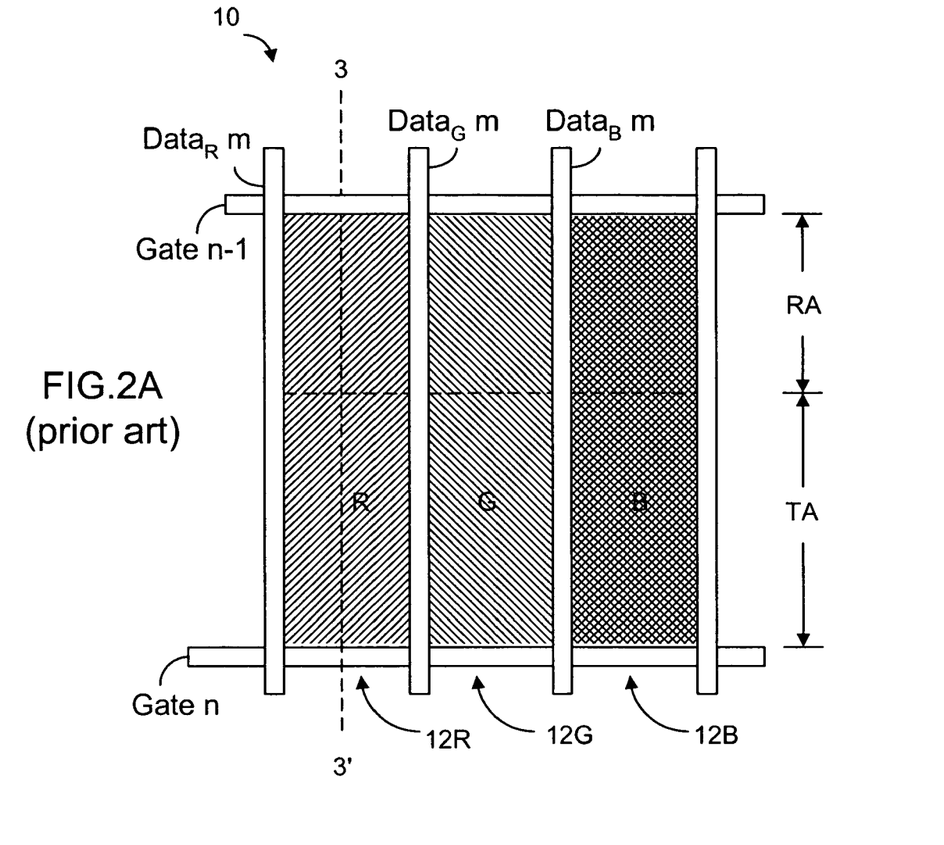
FIG. 2A is a schematic representation showing a plan view of the pixel structure of a conventional transflective color LCD panel.
Figure 2B:
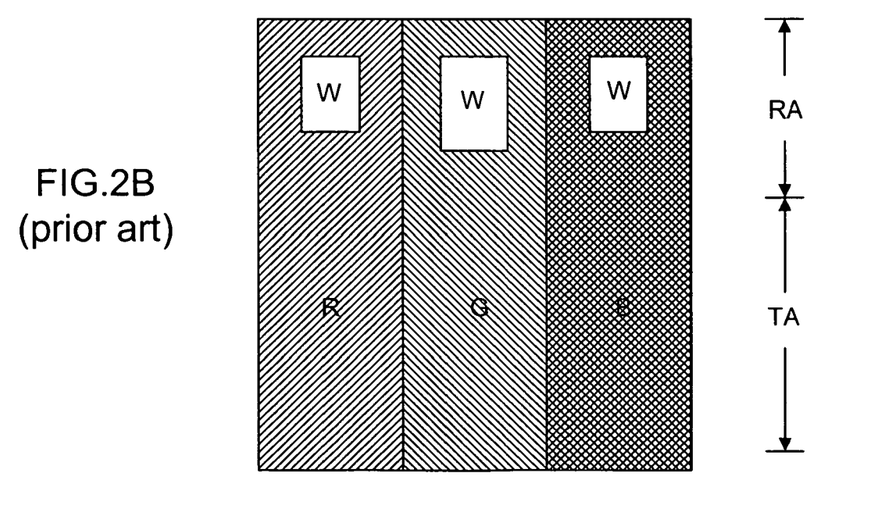
FIG. 2B is a schematic representation showing a color filter for use with a pixel in a conventional transflective color LCD panel.
Figure 3:
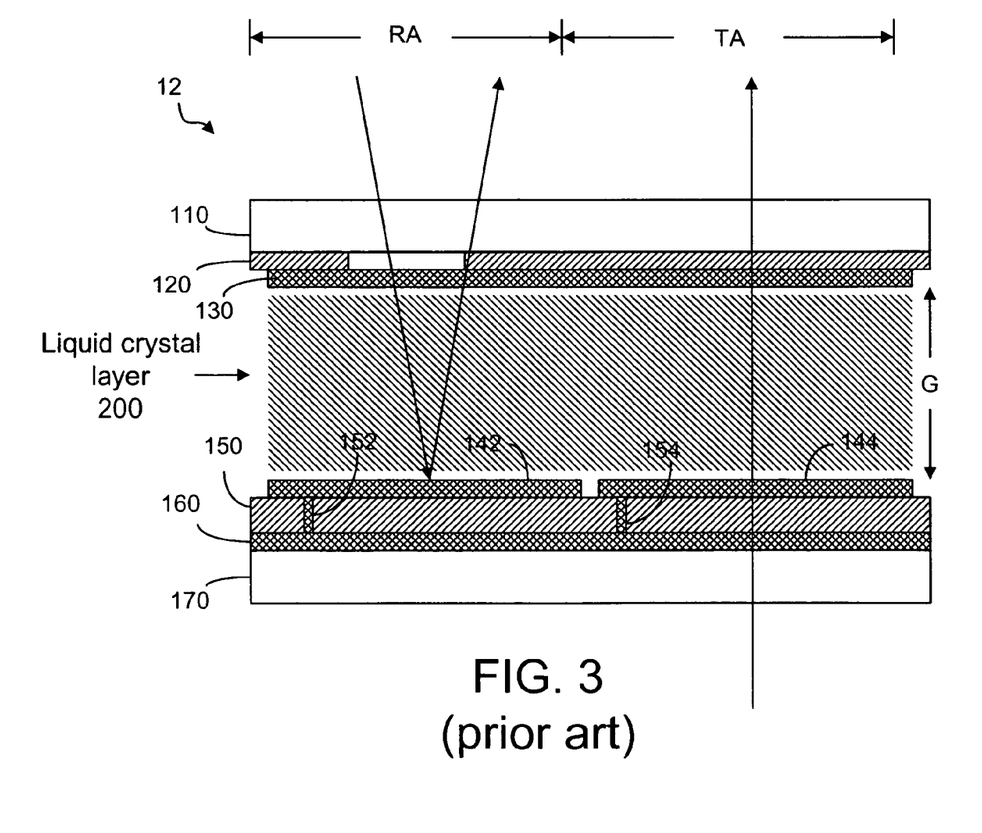
FIG. 3 is schematic representation showing a cross sectional view of a sub-pixel in the conventional transflective LCD panel, and the reflection and transmission of light beams in the sub-pixel.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2A illustrates a plan view of a pixel 10 in a conventional transflective liquid crystal panel. The pixel 10 is divided into three color sub-pixels 12R, 12G and 12B and each sub-pixel can be divided into a transmission area (TA) and a reflection area (RA). The pixel 10 is associated with a gate line, Gate n. The color sub-pixels 12R, 12G and 12B are separately associated with data lines $Data_R$ m, $Data_G$ m and $Data_B$ m. The color filter for use with a pixel 10 is shown in FIG. 2B. In FIG. 2B, the color filter has three color filter sections R, G, B corresponding to the color sub-pixels 12R, 12G, 12B of the pixel 10. A cross sectional view of a color sub-pixel 12 is shown in FIG. 3. As shown, the color sub-pixel 12 has an upper layer structure, a lower layer structure and a liquid crystal layer 200 disposed between the layer structures. The upper layer structure comprises an upper substrate 110, a color filter 120 and an upper electrode 130. The lower layer structure comprises a lower substrate 170, a device layer 160, a passivation layer 150 and an electrode layer. The electrode layer comprises a reflective electrode 142 in the reflection area electrically connected to the device layer through a via 152, and a transmissive electrode 144 in the transmission area electrically connected to the reflective electrode 142. The transmissive electrode 144 and the upper electrode are made from a transparent material such as indium-tin oxide (ITO). The reflective electrode 142 also serves as a reflector and is made from one or more highly reflective metals such as Al, Ag, Cr, Mo, Ti and AlNd.

If the overall reflectivity in the reflection areas is insufficient to produce a desired color density, voids or colorless filters within the color filter sections in the reflection areas are used to increase the reflectivity, as shown in FIG. 2B. With this color correction method, the color image quality of the LCD panel may not be desirable.

It is thus advantageous and desirable to provide a method and a sub-pixel structure for use in a transflective color LCD panel for increasing the reflectivity in the pixel without unduly degrading the color quality of the panel.

SUMMARY OF THE INVENTION

The pixel in a transflective color LCD panel of the present invention has an additional sub-pixel area. According to the present invention, a pixel is selectively divided into three color sub-pixels in R, G, B and a fourth sub-pixel M. Each of the color sub-pixels R, G and B is selectively divided into a transmission area and a reflection area. The fourth sub-pixel M can be entirely reflective or partially reflective. The color filter for use in the pixel comprises R, G, B color filter segments. corresponding to the R, G, B color sub-pixels and a filter segment for the fourth sub-pixel. The filter segment for the fourth sub-pixel can be entirely colorless or partially colorless. Furthermore, one or more of the R, G, B color filer segments associated with the reflection area may have a colorless sub-segment.

In an LCD panel having a plurality of pixel rows, each pixel row comprises pixels having four sub-pixels: three color sub-pixels and a fourth sub-pixel. Alternatively, only some of the pixels in a pixel row have four sub-pixels, and the other pixels in the pixel row have only three color sub-pixels. These pixels can be arranged in an alternate fashion.

In another embodiment, the four sub-pixels in each pixel in some pixel rows are arranged in a certain order, and the four sub-pixels in each pixel in other pixel rows are arranged in a different order. For example, the four sub-pixels in each pixel in the odd-numbered pixel rows are arranged in the order of R, G, B, W, whereas the four sub-pixels in each pixel in the even-numbered pixel rows are arranged in the order of G, B, W, R or B, W, R, G.

The present invention will become apparent upon reading the description taken in conjunction with FIGS. 4A-7D.

BRIEF DESCRIPTION OF THE DRAWINGS

FIGS. 4A-4H are schematic representations of various sub-pixel structures, according to the present invention, wherein a pixel is divided into three color sub-pixels R, G, B and a fourth sub-pixel M and wherein each of the color sub-pixels R, G, B is divided into a transmission area and a reflection area.

FIGS. 5A-5G are schematic representations showing various color filters for use in the sub-pixel structures, according to the present invention, wherein a color filter is divided into three color filter segments R, G, B and a fourth filter segment.

FIGS. 8D-8H are schematic representations of a sub-pixel structure wherein a pixel is divided into eight sub-pixels with each of six sub-pixels being divided into a transmission area and a reflection area and the remaining two sub-pixels being partially reflective or totally reflective, wherein:

FIGS. 8E and 8G show each of the remaining two sub-pixels being totally reflective.

DETAILED DESCRIPTION OF THE INVENTION

The pixel in a transflective color LCD panel of the present invention uses an additional sub-pixel having a colorless (W) filter segment and a reflective electrode associated with that filter segment. According to the present invention, a pixel is selectively divided into three color sub-pixels in R, G, B and a fourth sub-pixel M. Each of the color sub-pixels R, G and B is divided into a transmission area and a reflection area. Accordingly, each of the color sub-pixels R, G, B has a transmissive electrode in the transmission area and a reflective electrode in the reflection area. The fourth sub-pixel M can be entirely reflective or partially reflective. Thus, the sub-pixel M may or may not have a transmissive electrode. The color filter for use in the pixel comprises R, G, B color filter segments corresponding to the R, G, B color sub-pixels and a filter segment for the fourth sub-pixel. The filter segment for the fourth sub-pixel can be entirely colorless or partially colorless.

Figure 4A:
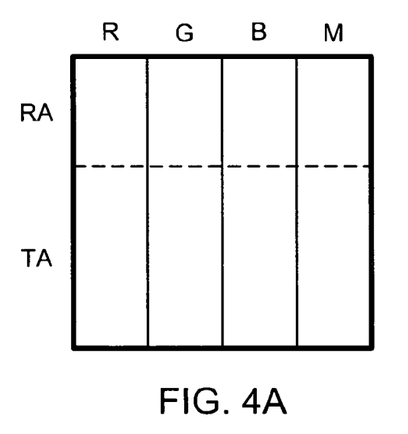
FIG. 4A shows a pixel wherein the areas of the sub-pixels R, G, B and M are substantially the same, and the reflection areas in those sub-pixels are also substantially equal to each other.
Figure 4B:
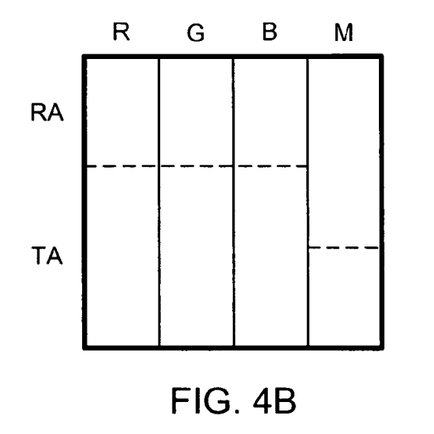
FIG. 4B shows a pixel wherein the areas of the sub-pixels R, G, B and M are substantially the same, but the reflection area in the sub-pixel M is larger than the reflection area in sub-pixels R, G and B.
Figure 4C:
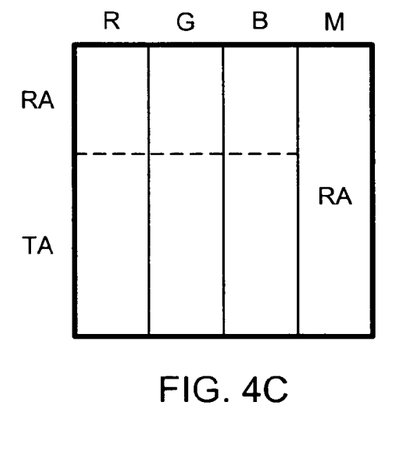
FIG. 4C shows a pixel wherein the area of the sub-pixels R, G, B and M are substantially the same, but the sub-pixel M is entirely reflective.
Figure 4D:
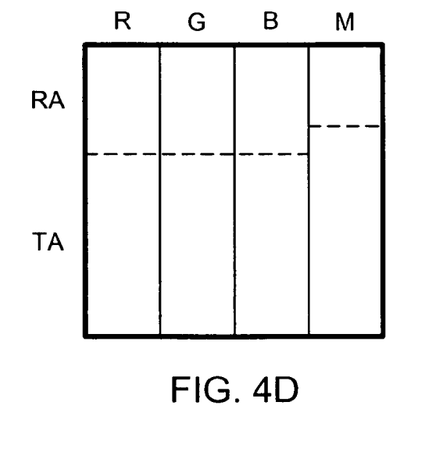
FIG. 4D shows a pixel wherein the areas of the sub-pixels R, G, B and M are substantially the same, but the reflection area in the sub-pixel M is smaller than the reflection area in sub-pixels R, G and B.
Figure 4E:
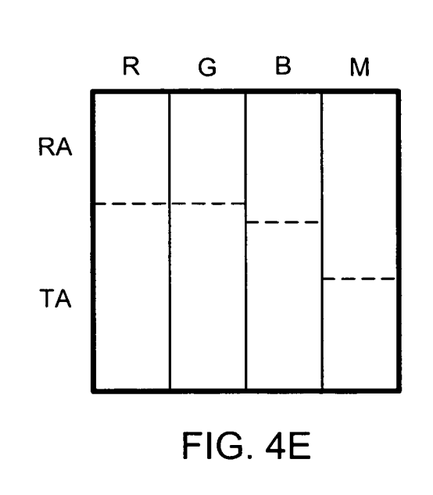
FIG. 4E shows a pixel wherein the areas of the sub-pixels R, G, B and M are substantially the same, but the reflection area in the sub-pixel M and the reflection area in sub-pixel G are different from the reflection area in sub-pixels R and B.

Because there are numerous combinations in the sizes and in the arrangement of electrodes and filter segments in the sub-pixel M, the embodiments disclosed herein and associated drawings are only examples for illustration purposes. In general, a pixel is selectively divided into four sub-pixels R, G, B and M. As shown in FIGS. 4A-4H, each of the color sub-pixels R, G, B is divided into a transmission area and a reflection area, but the sub-pixel M can be entirely or partially reflective. As shown in FIG. 4A, the areas of the sub-pixels R, G, B and M are substantially the same, and the reflection areas in those sub-pixels are also substantially equal to each other. In FIG. 4B, the areas of the sub-pixels R, G, B and M are substantially the same, but the reflection area in the sub-pixel M is larger than the reflection areas in sub-pixels R, G and B. In FIG. 4C, the sub-pixel M is entirely reflective. In FIG. 4D, the reflection area in the sub-pixel M is smaller than the reflection area in sub-pixels R, G and B. In FIG. 4E, the sub-pixels R, G, B and M are substantially the same, but the reflection area in the sub-pixel M and the reflection area in sub-pixel B are larger than the reflection areas in sub-pixels R and G. It is noted that the arrangement of sub-pixels as shown is for illustrative purpose only, and other arrangements are possible. For example, the reflection area in the sub-pixel M and the reflection area in sub-pixel G are larger than the reflection areas in sub-pixels R and B.

Figure 4F:
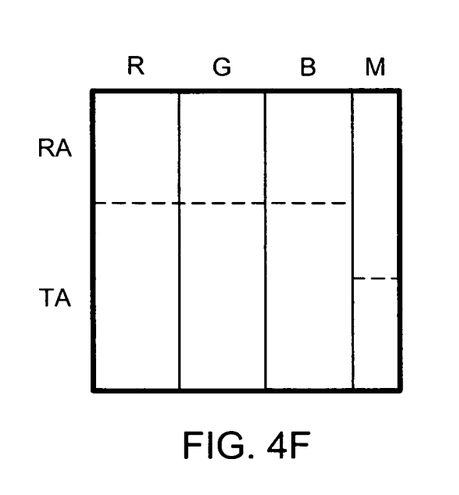
FIG. 4F shows a pixel wherein the area of the sub-pixel M is smaller than the area of the sub-pixels R, G, B and the sub-pixel M is partially reflective.
Figure 4G:
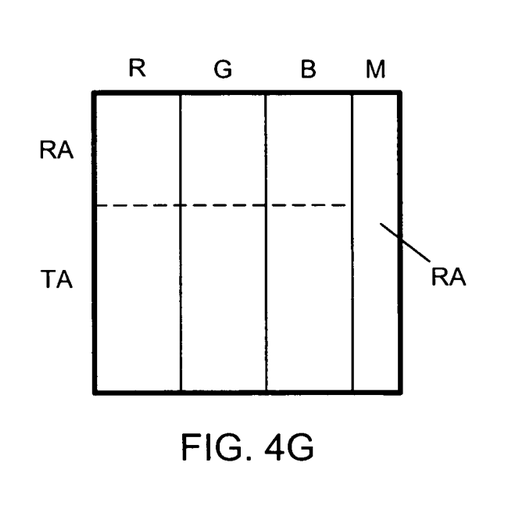
FIG. 4G shows a pixel wherein the area of the sub-pixel M is smaller than the area of the sub-pixels R, G, B and the sub-pixel M is entirely reflective.
Figure 4H:
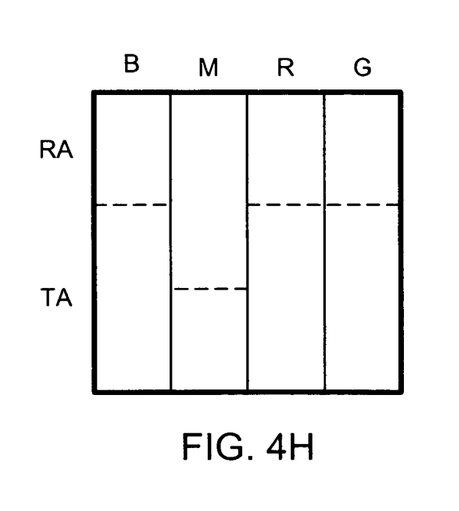
FIG. 4H shows a pixel wherein the areas of the sub-pixels R, G, B and M are substantially the same, but the reflection area in the sub-pixel M is larger than the reflection area in sub-pixels R, G and B and the sub-pixel M is located between two color sub-pixels.

The pixel structures as shown in FIGS. 4F and 4G are essentially the same as those shown in FIGS. 4B and 4C except that the area of sub-pixel M is smaller than the area of the color sub-pixels. In FIG. 4H, sub-pixel M is located between two of the color sub-pixels.

Figure 5A:
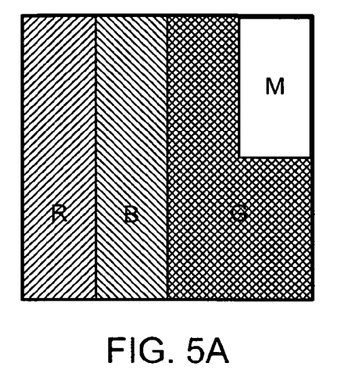
FIG. 5A shows a color filter wherein the areas of the color filter segments R, G, B and the fourth filter segment M are substantially the same, and the fourth filter segment is partially colorless.
Figure 5B:
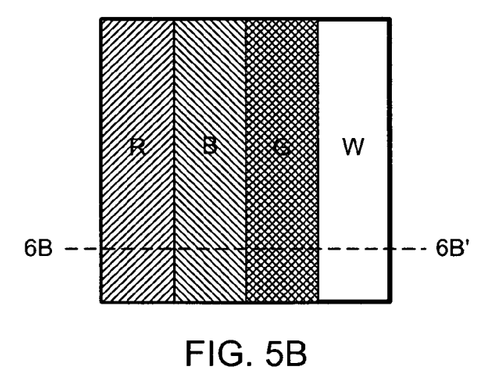
FIG. 5B shows a color filter wherein the areas of the color filter segments R, G, B and the fourth filter segment M are substantially the same, and the fourth filter segment is entirely colorless.
Figure 5C:
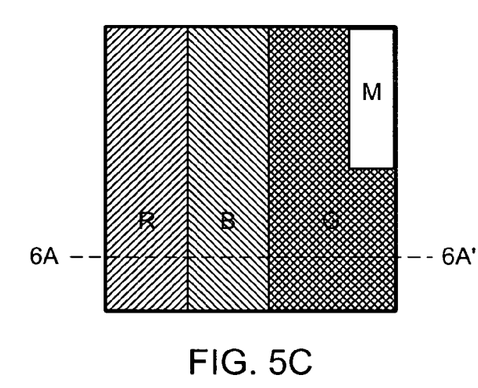
FIG. 5C shows a color filter wherein the area of the fourth filter segment is smaller than the area of the color filter segments R, G, B, and the fourth filter segment is partially colorless.
Figure 5D:
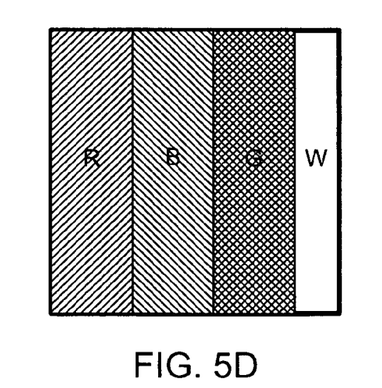
FIG. 5D shows a color filter wherein the area of the fourth filter segment is smaller than the area of the color filter segments R, G, B, and the fourth filter segment is entirely colorless.
Figure 5E:
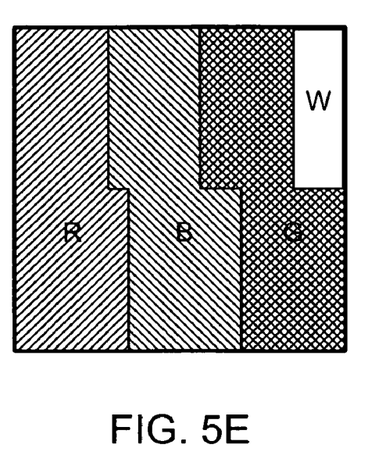
FIG. 5E shows a color filter wherein the color filter in the reflection area has three color filter sections of R, G, B and a fourth section of colorless filter, whereas the color filter in the transmission area has only three color filter sections of R, G and B.
Figure 5F:
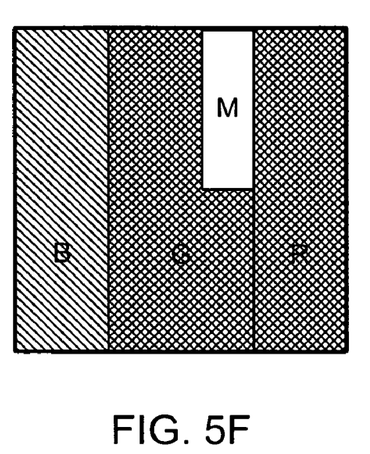
FIG. 5F shows a color filter wherein the areas of the color filter segments R, G, B and the fourth filter segment M are substantially the same, and the fourth filter segment is partially colorless and wherein the filter segment M is located between two color filter segments.

The color filter for use in a pixel as shown in FIGS. 4A to 4H can have many different designs. In general, the color filter must have three color filter segments in R, G, B, each corresponding to a color sub-pixel. The color filter also has a fourth filter segment. The fourth filter segment can be partially colorless, as shown in FIGS. 5A, 5C, 5E and 5F, but it can be entirely colorless (transparent, W), as shown in FIGS. 5B and 5D. The width of the fourth filter segment is generally the same as the width of the fourth sub-pixel M (see FIGS. 4A-4H). In a color filter where the fourth filter segment is partially colorless, the color of the remaining part of the fourth filter segment can be R, G or B. For example, the color of the remaining part is G, as shown in FIGS. 5A and 5C. In FIGS. 5A, 5C, 5E and 5F, the color combination in the fourth filter segment is W/G. However, the color combination can also be W/B or W/R.

Figure 6A:
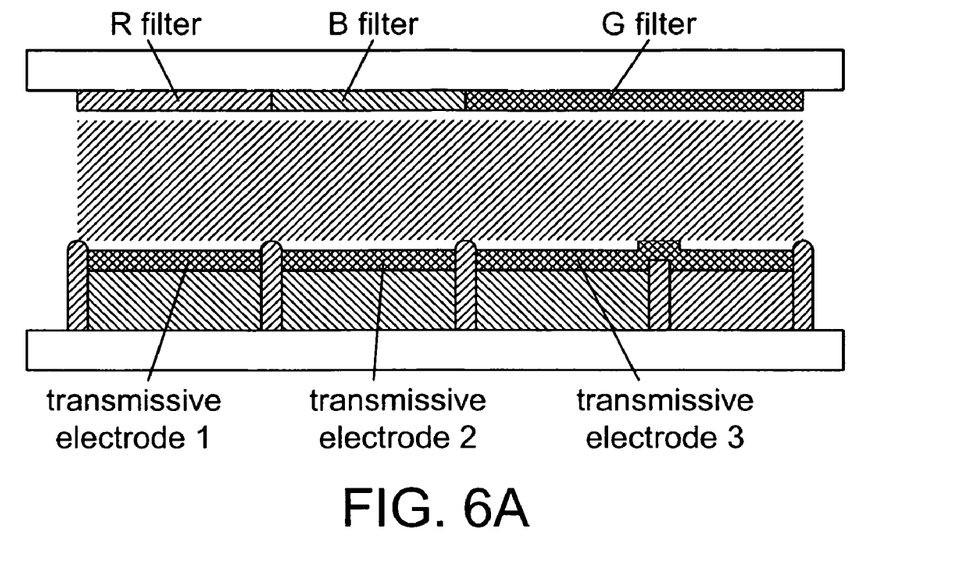
FIG. 6A is a schematic representation showing a cross sectional view of a pixel with three transmissive electrodes.

In a pixel where the fourth filter segment is partially colorless as shown in FIGS. 5A, 5C, 5E, and 5F, the transmission area of the pixel has three transmissive electrodes and one of these transmissive electrode is electrically connected to the transmissive electrode for the fourth sub-pixel. For example, when the color of the remaining part of the fourth filter segment is G, then the transmissive electrode for the fourth sub-pixel (M) is electrically connected to the transmissive electrode for the G sub-pixel, as shown in FIG. 6A. Accordingly, three switching elements (e.g., TFTs) are used to control the liquid crystal layers associated with the R, B and G/M transmissive electrodes.

Figure 5G:
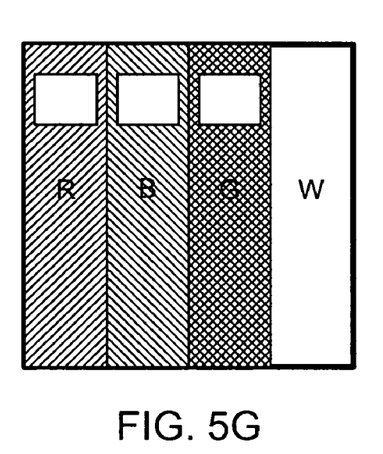
FIG. 5G shows a color filter wherein one or more of the R, G, B color filter segments associated with the reflection area of the pixel may have a colorless sub-segment.

In a different embodiment, the fourth filter section is entirely colorless and one or more of the color filter segments in R, G and B associated with the reflection area (see FIGS. 4A, 4B, 4C, 4D, 4E and 4H) have a colorless sub-segment. For example, all three color filter segments in R, G and B associated with the reflection area have a colorless sub-segment, as shown in FIG. 5G. The colorless sub-segments can be equal in size to each other or different in size.

Figure 6B:
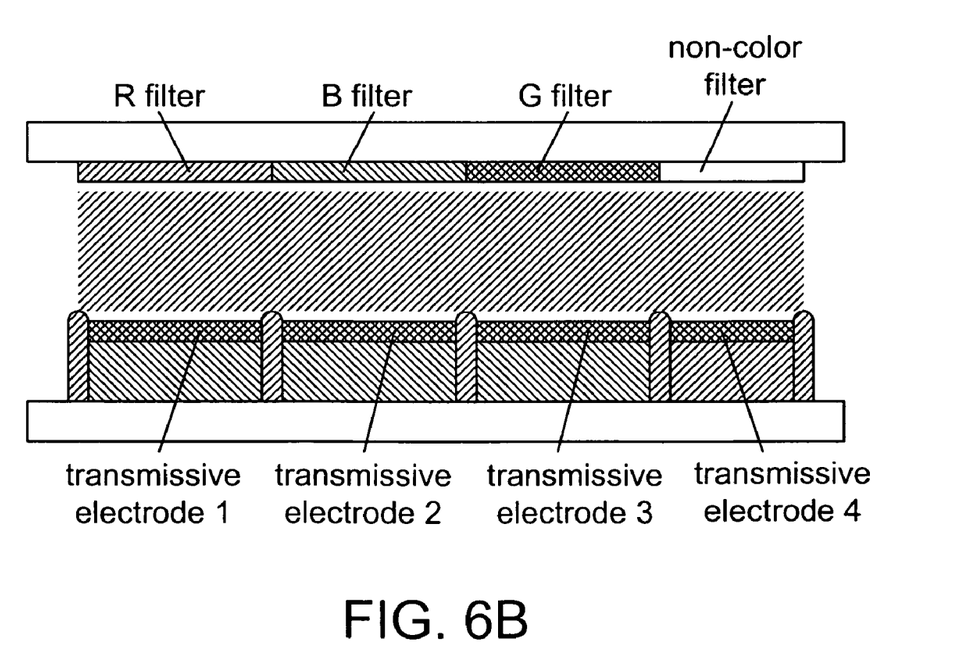
FIG. 6B is a schematic representation showing a cross sectional view of a pixel with four transmissive electrodes.

In a pixel where the fourth filter segment is entirely colorless (W) as shown in FIGS. 5B, 5D and 5G, the transmission area as well as the reflection area of the pixel has four transmissive electrodes such that each of the transmissive electrodes is separately controlled by a switching element. The four separate transmissive electrodes are shown in FIG. 6B.

In sum, according to the present invention, a pixel is selectively divided into three color sub-pixels R, G, B and a fourth sub-pixel M. The area of sub-pixel M can be the same or different from the color sub-pixels. Moreover, sub-pixel M can be partially reflective or entirely reflective. If the sub-pixel is partially reflective, the remaining part of the sub-pixel is transmissive. The transmissive part can be greater or smaller than or equal to the reflective part of sub-pixel M. A color filter for use in conjunction with such a pixel comprises three color filter segments in R, G and B and a fourth filter segment. The fourth filter segment can be partially or entirely colorless.

The present invention includes different pixel structures of four sub-pixels. Some of these different pixel structures are shown in FIGS. 4A to 4H. In a transflective color LCD panel, any one of the different structures can be used to form an array. However, two or more different structures can also be combined to form an array. Furthermore, a pixel structure of the present invention can be combined with a prior art pixel structure (see FIGS. 2A and 2B). A few examples of the pixel organization of the transflective color LCD panel, according to the present, are shown in FIGS. 7A to 7D.

Figure 7A:
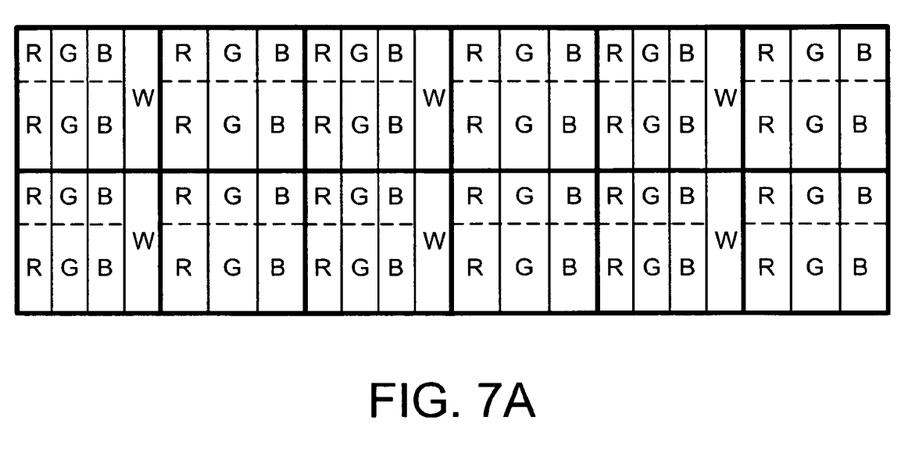
FIG. 7A is a schematic representation of a pixel array combining a prior art pixel structure and one pixel structure of the present invention.

FIG. 7A shows an array of pixels in a transflective color LCD panel, wherein the pixel structure as shown in FIG. 4C or 4G is used in combination with a prior art pixel structure (see FIG. 2A). As shown in FIG. 7A, different pixel structures are used alternately to form a pixel row.

Figure 7B:
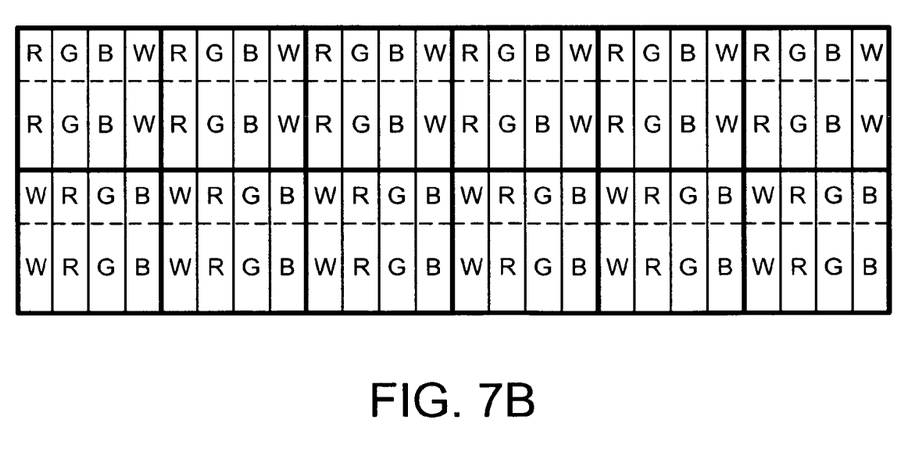
FIG. 7B is a schematic representation of a pixel array using two different pixel structures of the present invention.

FIG. 7B shows an array of pixels, wherein two different pixel structures of the present invention are used to form a pixel array. In FIG. 7B, the upper row is formed by the pixel structure as shown in 4A. In the lower row, the pixel structure is slightly different in that the sub-pixel M is located adjacent to the sub-pixel R.

Figure 7C:
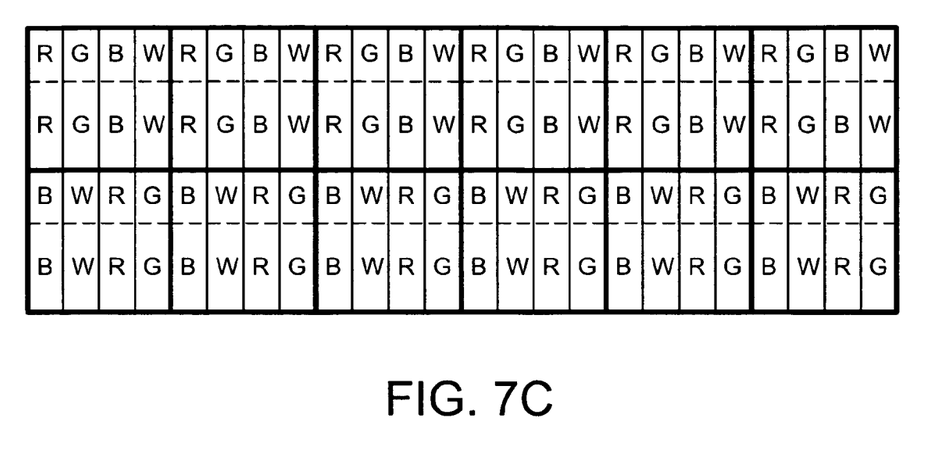
FIG. 7C is a schematic representation of another pixel array using two different pixel structures of the present invention.

FIG. 7C shows an array of pixels, wherein two different pixel structures of the present invention are used to form a pixel array. In FIG. 7C, the upper row is formed by the pixel structure as shown in 4A. In the lower row, the pixel structure is slightly different in that the sub-pixel M is located between the sub-pixel R and the sub-pixel B as shown in FIG. 4H.

Figure 7D:
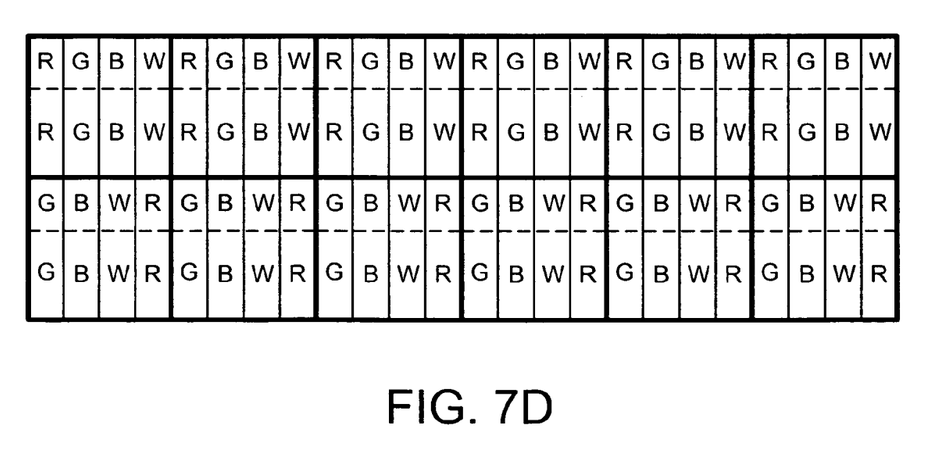
FIG. 7D is a schematic representation of a different pixel array using two different pixel structures of the present invention.

FIG. 7D shows an array of pixels, wherein two different pixel structures of the present invention are used to form a pixel array. In FIG. 7D, the upper row is formed by the pixel structure as shown in 4A. In the lower row, the pixel structure is slightly different in that the sub-pixel M is located between the sub-pixel B and the sub-pixel R.

It should be appreciated by a person skilled in the art that the possible combinations of different pixel structures for forming a pixel row and a pixel array are numerous. FIGS. 7A-7D are shown for illustrative purposes only. For example, it is possible that a certain combination of pixel structures is used on the right side of a transflective LCD panel and a different combination is used on the left side of the panel. Alternatively, only a section of the panel uses one or more pixel structures according to the present invention, and the remaining section uses a prior art pixel structure.

Furthermore, in FIGS. 4A-4H and 5A-5F, the sub-pixels R, G, B and M are arranged as a plurality of strips disposed side-by-side within a pixel. It is possible that these sub-pixels are separately arranged to occupy four quadrants of a rectangle or square pixel. It is also possible that three of the quadrants are separately occupied by the R, G, B sub-pixels and the remaining one quadrant is used as a combined area for the M sub-pixel along with part of the color sub-pixels. For example, in a pixel where the fourth filter segment is partially colorless and the color of the remaining part of the fourth filter segment is G as shown in FIGS. 5A and 5C, the filter in the combined area is partially for the colorless and partially G. This type of sub-pixel arrangement is known as a mosaic arrangement.

Figure 8A:
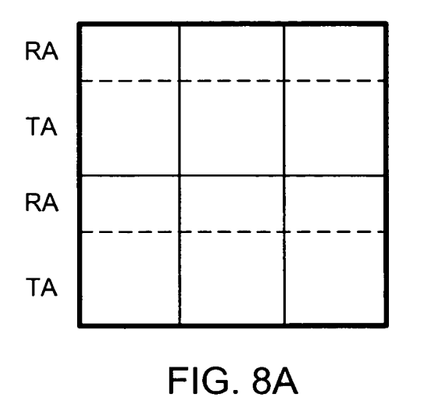
FIG. 8A is a schematic representation of a different sub-pixel structure, according to the present invention, wherein a pixel is divided into six sub-pixels, and wherein each of the sub-pixels is divided into a transmission area and a reflection area.
Figure 8B:
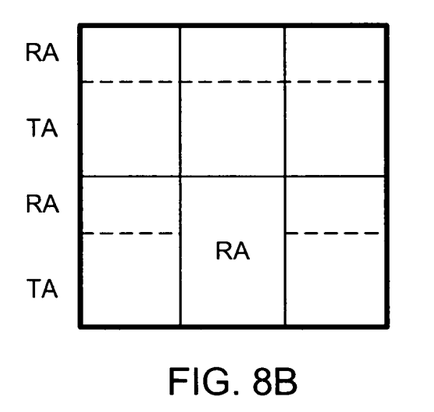
FIG. 8B shows a pixel divided into six sub-pixels, wherein one of the sub-pixel is entirely reflective.

In the preferred embodiment of the present invention, a pixel is selectively divided into four sub-pixels, wherein three of the sub-pixels are color sub-pixels and one is a sub-pixel M. In another embodiment of the present invention, a pixel is selectively divided into six sub-pixels, wherein five of the sub-pixels are color sub-pixels and one is a sub-pixel M (the middle lower sub-pixel, see FIG. 9A). The sub-pixel M can be divided into a transmission area and a reflection area, similar to the other five sub-pixels, as shown in FIG. 8A. However, the sub-pixel M can be totally reflective, as shown in FIG. 8B. Alternatively, the sub-pixel M has a larger reflection area than that in the other five sub-pixels, as shown in FIG. 8C.

Figure 8D:
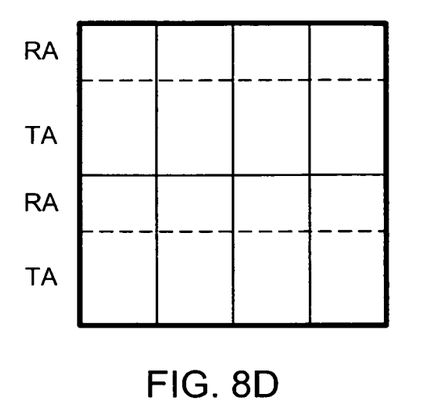
FIG. 8D shows each of the remaining two sub-pixels being divided into a transmission area and a reflective area, similar to the other six sub-pixels.
Figure 8E:
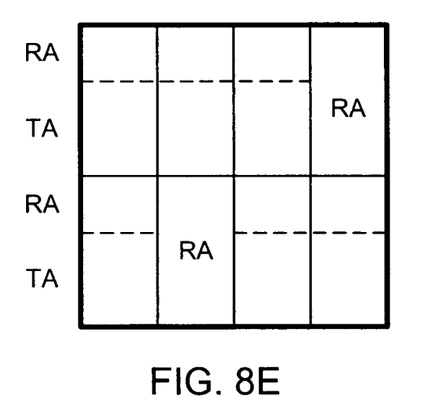
Figure 8F:
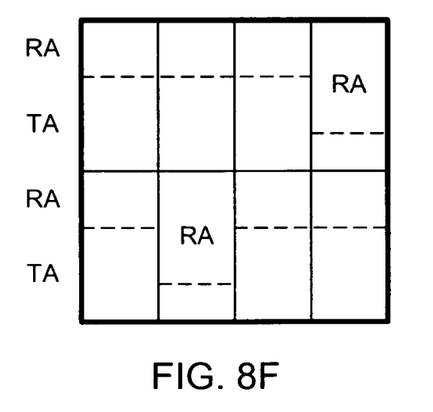
FIGS. 8F and 8H show each of the remaining two sub-pixels being partially reflective with its reflection area being larger than that in the other six sub-pixels.
Figure 8G:
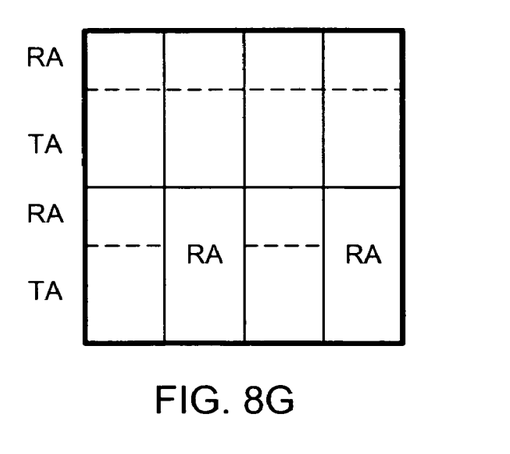
Figure 8H:
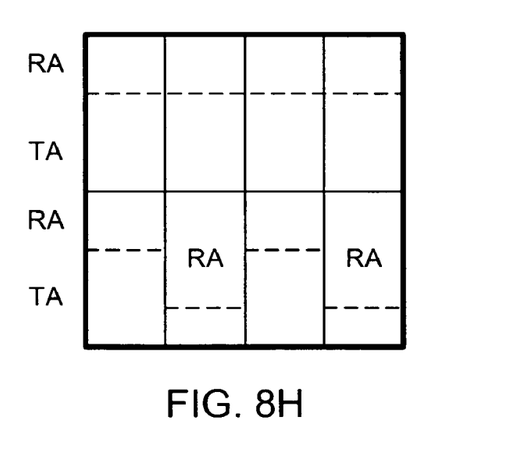
Figure 9A:
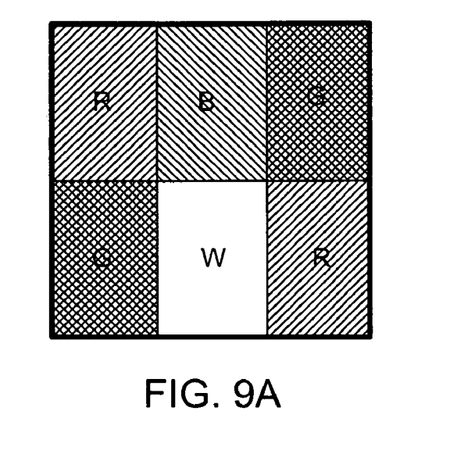
FIG. 9A shows a pixel being divided into six sub-pixels, wherein the filter segment for one of the sub-pixels is colorless.
Figure 9B:
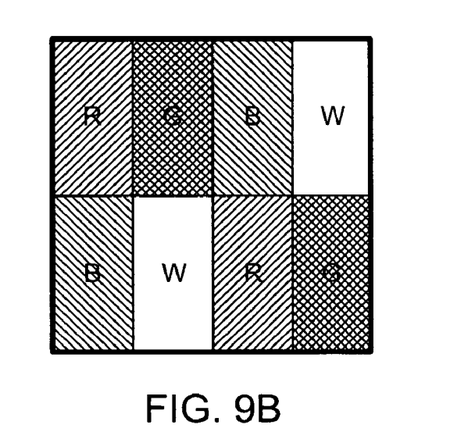
FIG. 9B shows a pixel being divided into eight sub-pixels, wherein the filter segments for two of the sub-pixels are colorless.
Figure 9C:
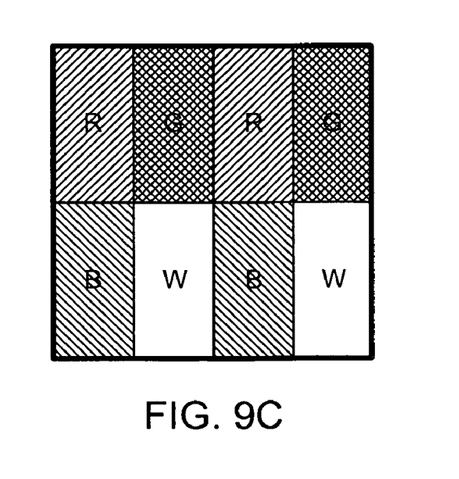
FIG. 9C shows a pixel being divided into eight sub-pixels, wherein the filter segments for two of the sub-pixels are colorless in a different arrangement.

In yet another embodiment of the present invention, a pixel is selectively divided into eight sub-pixels, wherein six of the sub-pixels are color sub-pixels and the remaining two are sub-pixels M (corresponding to the location of filter segments W in FIG. 9B or 9C). Each of the sub-pixels M can be divided into a transmission area and a reflection area, similar to the other six sub-pixels, as shown in FIG. 8D. However, the sub-pixels M can be totally reflective, as shown in FIGS. 8E and 8G. Alternatively, each of the sub-pixels M has a larger reflection area than that in the other six sub-pixels, as shown in FIGS. 8F and 8H.

Figure 8C:
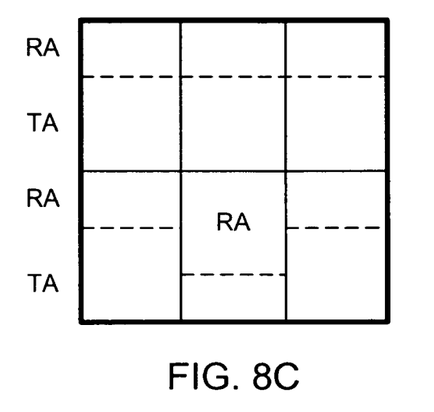
FIG. 8C shows a pixel divided into six sub-pixels, wherein the reflection area in one of the sub-pixel is larger than that in the other sub-pixels.

The color filter associated with the pixel structures as shown in FIG. 8A-8C may comprise a colorless filter segment and five color filter segments, as shown in FIG. 9A. The color filter associated with the pixel structures as shown in FIGS. 8E and 8F may comprise two colorless filter segments and six color filter segments, as shown in FIG. 9B. As shown in FIG. 9B, each of the upper and lower parts of the color filter comprises four different filter segments. The color filter associated with the pixel structures as shown in FIG. 8G and 8H may comprise two colorless filter segments and six color filter segments, as shown in FIG. 9C. As shown in FIG. 9C, both colorless filter segments are located in the lower part of the color filter.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A transflective liquid crystal display having a plurality of pixels, comprising: a first substrate having a common electrode; a second substrate; and a liquid crystal layer disposed between the first and second substrate, the liquid crystal layer comprising a plurality of layer segments associated with a plurality of pixels, wherein at least some of the pixels comprise a plurality of sub-pixels and wherein at least three of the sub-pixels are color sub-pixels for providing three different colors in the liquid crystal display and at least one of the sub-pixels is a fourth sub-pixel for providing a fourth color different from said three colors, and wherein each of the color sub-pixels comprises a transmission area having a transmissive electrode disposed on the second substrate and a reflection area having a reflective electrode disposed on the second substrate, and the fourth sub-pixel comprises a further reflective electrode disposed on the second substrate, wherein the fourth sub-pixel has a reflection area associated with the further reflective electrode, said fourth sub-pixel further comprises a transmission area having a further transmissive electrode disposed on the second substrate.

2. The transflective liquid crystal display of claim 1, wherein the reflection area in the fourth sub-pixel is smaller than the reflection area in each of the color sub-pixels.

3. The transflective liquid crystal display of claim 1, wherein the reflection area in the fourth sub-pixel is substantially equal to the reflection area in each of the color sub-pixels.

4. The transflective liquid crystal display of claim 1, wherein the reflection area in the fourth sub-pixel is larger than the reflection area in each of the color sub-pixels.

5. The transflective liquid crystal display of claim 1, wherein the further transmission electrode is electrically connected to the transmissive electrode of one of the color sub-pixels.

6. The transflective liquid crystal display of claim 1, wherein the fourth sub-pixel is equal in area to at least one of the color sub-pixels.

7. The transflective liquid crystal display of claim 1, wherein the fourth sub-pixel is smaller than each of the color sub-pixels.

8. The transflective liquid crystal display of claim 1, wherein the fourth sub-pixel is larger than each of the color sub-pixels.

9. The transflective liquid crystal display of claim 1, wherein each pixel further comprises a filter disposed on the first substrate, the filter comprising three color filter segments and a fourth filter segment, and wherein
    each of the color filter segments has a color associated with one of the color sub-pixels, and
    the fourth filter segment has a colorless sub-segment and a color sub-segment having a color substantially the same as the color of one of the color filter segments.

10. The transflective liquid crystal display of claim 1, wherein each pixel further comprises a filter disposed on the first substrate, the filter comprising three color filter segments and a fourth filter segment, and wherein
    each of the color filter segments has a color associated with one of the color sub-pixels, and
    the fourth filter segment has a colorless sub-segment associated with the further reflective electrode, and a color sub-segment associated with the further transmissive electrode, the color sub-segment having a color substantially the same as the color of one of the color filter segments.

11. The transflective liquid crystal display of claim 1, wherein each pixel further comprises a filter disposed on the first substrate, the filter comprising three color filter segments and a fourth filter segment, and wherein
    each of the color filter segments has a color associated with one of the color sub-pixels, and
    the fourth filter segment is colorless.

12. The transflective liquid crystal display of claim 1, wherein each pixel further comprises a filter disposed on the first substrate, the filter comprising three color filter segments and a fourth filter segment, and wherein
    the fourth filter segment is colorless, and
    each of the color filter segments has a color associated with one of the color sub-pixels, wherein at least one of the color filter segments has a colorless sub-segment disposed in the reflection area of the color sub-pixels associated with said at least one color filter segment.

13. The transflective liquid crystal display of claim 1, wherein the color sub-pixels and the fourth sub-pixel are arranged as a plurality of strips within said pixel and the fourth sub-pixel is adjacent to only one of the color sub-pixels within said each pixel.

14. The transflective liquid crystal display of claim 1, wherein the color sub-pixels and the fourth sub-pixel are arranged as a plurality of strips within said pixel and the fourth sub-pixel is disposed between two of the color sub-pixels.

15. The transflective liquid crystal display of claim 1, wherein the color sub-pixels and the fourth sub-pixel are disposed in four quadrants of a rectangular or square pixel.

16. The transflective liquid crystal display of claim 1, wherein some of the pixels have only three color sub-pixels.

17. The transflective liquid crystal display of claim 1, wherein the pixels are arranged in a plurality of pixel rows including a pixel row and an adjacent pixel row, wherein the color sub-pixels and the fourth sub-pixel in each of the pixel in the pixel row are arranged in a first order, and the color sub-pixels and the fourth sub-pixel in each of the pixel in the adjacent pixel row are arranged in a second order different from the first order.

18. A method to improve viewing quality of a transflective liquid crystal display having a plurality of pixels, said method comprising the steps of: partitioning each of at least some of the pixels into a plurality of sub-pixels, wherein at least three of the sub-pixels are color sub-pixels for providing three different colors in the display and at least one of the sub-pixels is a fourth sub-pixel for providing a fourth color different from the three colors; partitioning each of said color sub-pixels into a transmission area having a transmissive electrode and a reflection area having a reflective electrode; and providing a further reflective electrode in the fourth sub-pixel, wherein the fourth sub-pixel is partitioned into a transmission area and a reflection area, the reflection area being associated with the further reflective electrode, said method further comprising the step of providing a further transmissive electrode in the transmission area of the fourth sub-pixel.

19. The method of claim 18, further comprising the step of providing a color filter to the pixel, the color filter having three color filter segments, each of the color filter segments being associated with one of the color sub-pixels.

20. The method of claim 18, wherein each of said at least some pixels further comprises a color filter, the color filter comprising three color filter segments, each of the color filter segments being associated with one of the color sub-pixel, and wherein the color filter further comprises a further filter segment associated with the further transmissive electrode in the fourth sub-pixel.

21. The method of claim 18, wherein the color filter segment of at least one color sub-pixel has a colorless sub-segment associated with the reflective electrode in said at least one color sub-pixel.

* * * * *

UNITED STATES PATENT AND TRADEMARK OFFICE
CERTIFICATE OF CORRECTION

PATENT NO. : 7,564,530 B2  Page 1 of 1
APPLICATION NO. : 11/321011
DATED : July 21, 2009
INVENTOR(S) : Chih-Jen Hu et al.

It is certified that error appears in the above-identified patent and that said Letters Patent is hereby corrected as shown below:

In the abstract, line 13 "filer" should be --filter--.
In column 2, line 19 "filer" should be --filter--.

Signed and Sealed this

Twenty-seventh Day of October, 2009

David J. Kappos
*Director of the United States Patent and Trademark Office*